United States Patent
Laborczfalvi

(10) Patent No.: US 11,501,057 B2
(45) Date of Patent: *Nov. 15, 2022

(54) ENABLING FILE ATTACHMENTS IN CALENDAR EVENTS

(71) Applicant: Citrix Systems, Inc., Fort Lauderdale, FL (US)

(72) Inventor: Lee Laborczfalvi, Freiburg (DE)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/324,687

(22) Filed: May 19, 2021

(65) Prior Publication Data

US 2021/0326513 A1    Oct. 21, 2021

Related U.S. Application Data

(63) Continuation of application No. 14/635,166, filed on Mar. 2, 2015, now Pat. No. 11,036,919.

(51) Int. Cl.
*G06F 40/134* (2020.01)
*G06F 16/23* (2019.01)
(Continued)

(52) U.S. Cl.
CPC ............ *G06F 40/134* (2020.01); *G06F 16/23* (2019.01); *G06Q 10/107* (2013.01);
(Continued)

(58) Field of Classification Search
CPC ..... G06F 40/134; H04L 51/08; G06Q 10/107; G06Q 10/109
See application file for complete search history.

(56) References Cited

U.S. PATENT DOCUMENTS

| 6,052,735 A | * | 4/2000 | Ulrich ..................... G06F 8/61 709/224 |
| 6,272,545 B1 | | 8/2001 | Flanagin et al. |

(Continued)

FOREIGN PATENT DOCUMENTS

WO    2013159175 A1    10/2013

OTHER PUBLICATIONS

Jul. 16, 2015 (WO) International Search Report and Written Opinion—App. PCT/US2015/019859.

(Continued)

*Primary Examiner* — Benjamin Smith
(74) *Attorney, Agent, or Firm* — Banner & Witcoff, Ltd.

(57) ABSTRACT

Methods and systems for enabling file attachments in a mobile calendar application are presented. In some embodiments, a mobile device may receive a message comprising an electronic calendar invitation and an electronic file attachment. The mobile device may generate an association between the electronic file attachment received in the message and a calendar event in an electronic calendar mobile application executing on the mobile computing device, wherein the calendar event is associated with the electronic calendar invitation. In response to receiving a selection to display the calendar event in the electronic calendar mobile application, the mobile device may generate a display of the calendar event comprising a display of the associated electronic file attachment in the electronic calendar mobile application.

18 Claims, 8 Drawing Sheets

(51) Int. Cl.
*G06Q 10/10* (2012.01)
*H04L 51/08* (2022.01)

(52) U.S. Cl.
CPC ....... *G06Q 10/109* (2013.01); *G06Q 10/1093* (2013.01); *H04L 51/08* (2013.01)

(56) References Cited

U.S. PATENT DOCUMENTS

| | | | |
|---|---|---|---|
| 7,375,840 B2 * | 5/2008 | Buschi | G06F 16/93 |
| | | | 358/1.15 |
| 7,634,546 B1 | 12/2009 | Strickholm et al. | |
| 7,647,559 B2 * | 1/2010 | Yozell-Epstein | G06Q 10/107 |
| | | | 715/752 |
| 7,831,676 B1 * | 11/2010 | Nagar | G06Q 10/107 |
| | | | 709/224 |
| 8,650,254 B2 * | 2/2014 | Kieselbach | G06F 40/197 |
| | | | 709/206 |
| 8,700,719 B1 * | 4/2014 | Covitz | G06Q 10/107 |
| | | | 709/204 |
| 9,112,936 B1 | 8/2015 | Poletto et al. | |
| 9,299,065 B2 * | 3/2016 | Hymel | H04L 51/08 |
| 9,584,343 B2 * | 2/2017 | Brezina | H04L 51/04 |
| 9,602,453 B2 * | 3/2017 | Bhatia | H04L 51/18 |
| 9,614,796 B2 | 4/2017 | Aleksandrov | |
| 10,164,920 B2 * | 12/2018 | Murphy | H04L 67/02 |
| 10,475,000 B2 * | 11/2019 | Sarrazin | G06Q 10/107 |
| 10,721,198 B1 | 7/2020 | Chitrapu | |
| 2001/0014866 A1 | 8/2001 | Conmy et al. | |
| 2002/0049603 A1 | 4/2002 | Mehra et al. | |
| 2002/0049749 A1 | 4/2002 | Helgeson et al. | |
| 2003/0041076 A1 | 2/2003 | Lucovsky et al. | |
| 2003/0046434 A1 | 3/2003 | Flanagin et al. | |
| 2003/0084111 A1 * | 5/2003 | Yasuta | G06Q 10/107 |
| | | | 709/206 |
| 2003/0158855 A1 | 8/2003 | Farnham et al. | |
| 2003/0182323 A1 * | 9/2003 | Demsky | G06F 16/94 |
| 2004/0111307 A1 | 6/2004 | Demsky et al. | |
| 2004/0185877 A1 | 9/2004 | Asthana et al. | |
| 2005/0076085 A1 | 4/2005 | Budd et al. | |
| 2005/0076087 A1 | 4/2005 | Budd et al. | |
| 2006/0075046 A1 * | 4/2006 | Yozell-Epstein | G06Q 10/107 |
| | | | 709/206 |
| 2006/0085508 A1 | 4/2006 | Uchida et al. | |
| 2006/0150175 A1 | 7/2006 | Etelapera | |
| 2007/0022166 A1 * | 1/2007 | Bhogal | G06Q 10/107 |
| | | | 709/206 |
| 2007/0143425 A1 * | 6/2007 | Kieselbach | G06Q 10/107 |
| | | | 709/206 |
| 2007/0299972 A1 | 12/2007 | Brake et al. | |
| 2008/0027955 A1 | 1/2008 | May et al. | |
| 2008/0114720 A1 | 5/2008 | Smith et al. | |
| 2008/0120360 A1 | 5/2008 | Dumitru et al. | |
| 2008/0262867 A1 | 10/2008 | Bayne et al. | |
| 2009/0040875 A1 | 2/2009 | Buzescu et al. | |
| 2009/0089378 A1 | 4/2009 | Maresh | |
| 2009/0119678 A1 | 5/2009 | Shih et al. | |
| 2009/0177754 A1 * | 7/2009 | Brezina | H04L 51/04 |
| | | | 709/206 |
| 2009/0187852 A1 * | 7/2009 | Tsuruta | G06Q 10/107 |
| | | | 715/781 |
| 2009/0247134 A1 | 10/2009 | Jeide et al. | |
| 2009/0282125 A1 | 11/2009 | Jeide et al. | |
| 2010/0011068 A1 | 1/2010 | Jain et al. | |
| 2010/0017404 A1 | 1/2010 | Banerjee et al. | |
| 2010/0131604 A1 * | 5/2010 | Portilla | G06Q 10/107 |
| | | | 709/206 |
| 2011/0029625 A1 * | 2/2011 | Cheng | G06Q 10/107 |
| | | | 709/206 |
| 2011/0087958 A1 | 4/2011 | Dumitru et al. | |
| 2011/0112856 A1 | 5/2011 | Rousso et al. | |
| 2011/0153857 A1 | 6/2011 | Dumitru et al. | |
| 2011/0265005 A1 | 10/2011 | Zhao et al. | |
| 2012/0030552 A1 | 2/2012 | Zilberman-Kubovsky et al. | |
| 2012/0117460 A1 | 5/2012 | Sylthe et al. | |
| 2012/0209922 A1 * | 8/2012 | Bhatia | H04L 51/00 |
| | | | 709/206 |
| 2012/0278404 A1 * | 11/2012 | Meisels | G06Q 10/107 |
| | | | 709/206 |
| 2012/0278405 A1 | 11/2012 | Costenaro et al. | |
| 2012/0284637 A1 * | 11/2012 | Boyer | G06Q 10/109 |
| | | | 715/751 |
| 2013/0061307 A1 | 3/2013 | Livne | |
| 2013/0086176 A1 * | 4/2013 | Bhogal | G06Q 10/107 |
| | | | 709/206 |
| 2013/0166660 A1 | 6/2013 | Chung et al. | |
| 2013/0218982 A1 * | 8/2013 | Hymel | H04L 51/08 |
| | | | 709/206 |
| 2013/0262601 A1 * | 10/2013 | Bao | H04L 51/16 |
| | | | 709/206 |
| 2013/0318079 A1 | 11/2013 | Kindel | |
| 2013/0325399 A1 | 12/2013 | Yuen et al. | |
| 2014/0172997 A1 * | 6/2014 | Chan | H04L 51/04 |
| | | | 709/206 |
| 2014/0189021 A1 * | 7/2014 | Kadashevich | H04L 51/08 |
| | | | 709/206 |
| 2014/0310044 A1 | 10/2014 | Meltzer et al. | |
| 2014/0310045 A1 * | 10/2014 | Meltzer | G06Q 10/1095 |
| | | | 705/7.19 |
| 2015/0081369 A1 * | 3/2015 | Sarrazin | G06Q 10/107 |
| | | | 705/7.18 |
| 2015/0142870 A1 | 5/2015 | Hashimoto | |
| 2015/0200885 A1 * | 7/2015 | Sharp | H04L 51/08 |
| | | | 709/206 |
| 2015/0264111 A1 * | 9/2015 | Aleksandrov | H04L 67/2823 |
| | | | 726/4 |
| 2015/0350133 A1 * | 12/2015 | Murphy | H04L 67/02 |
| | | | 709/203 |
| 2015/0370618 A1 | 12/2015 | Yaary et al. | |
| 2016/0026776 A1 | 1/2016 | Hurst | |
| 2016/0026977 A1 | 1/2016 | Umapathy | |
| 2016/0055131 A1 | 2/2016 | Shigabutdinov | |
| 2016/0142350 A1 | 5/2016 | Mutha et al. | |
| 2016/0203444 A1 | 7/2016 | Frank et al. | |
| 2016/0232137 A1 | 8/2016 | Liu | |
| 2016/0323217 A1 * | 11/2016 | Subramani | G06F 40/274 |
| 2017/0142042 A1 * | 5/2017 | Bandi | G06F 16/9577 |

OTHER PUBLICATIONS

Jun. 27, 2017—U.S. Non-final Office Action—U.S. Appl. No. 14/635,166.
Jan. 2, 2018—U.S. Final Office Action—U.S. Appl. No. 14/635,166.
Jun. 20, 2018—U.S. Non-final Office Action—U.S. Appl. No. 14/635,166.
Mar. 22, 2019—U.S. Final Office Action—U.S. Appl. No. 14/635,166.
Oct. 3, 2019—U.S. Non-final Office Action—U.S. Appl. No. 14/635,166.
Apr. 16, 2020—U.S. Final Office Action—U.S. Appl. No. 14/635,166.
Oct. 7, 2020—U.S. Non-final Office Action—U.S. Appl. No. 14/635,166.
Feb. 8, 2021—U.S. Notice of Allowance—U.S. Appl. No. 14/635,166.

\* cited by examiner

ENABLING FILE ATTACHMENTS IN CALENDAR EVENTS

CROSS REFERENCE TO RELATED APPLICATION

This application claims priority to and is a continuation of U.S. patent application Ser. No. 14/635,166, filed Mar. 2, 2015. The contents of which are hereby incorporated by reference in their entirety for all purposes

FIELD

Aspects described herein generally relate to data access in mobile applications. More specifically, aspects described herein relate to techniques for enabling file attachments to be accessed in a mobile calendar application.

BACKGROUND

More and more people are using mobile devices in personal and business settings for a variety of purposes. These devices are often used by individuals to send and receive emails, manage appointments, share media files, consume media content, and perform a plethora of other activities, sometimes from remote or unusual locations. As these devices continue to grow in popularity and provide an increasing number of business applications, enterprise mobile applications are providing employees with means to access networked enterprise applications from their mobile device. Users are able to access their emails, calendar appointments, and other mobile applications across multiple different devices with the advent of cloud-based applications and devices.

Mobile enterprise applications rely on data synchronization protocols to allow users access to applications, enterprise data, and account information on multiple different devices under the same account. Application data and account specific data may be synchronized across multiple different networked devices and servers using such data synchronization protocols. However, in current mobile devices, some mobile applications are not able to allow their users to access content that would be visible to them while using a desktop application counterpart of the mobile application. Conventional mobile calendar applications cannot allow a user to access a file attachment associated with an appointment even though such a file attachment associated with the appointment may be visible to the same user having logged into the same user account on a desktop application showing the calendar appointment. Although mobile users can schedule, accept, and view their calendar appointments on their mobile device, they cannot view file attachments embedded in such appointments. Conventional mobile calendar applications also do not allow mobile users to attach files to new appointments that are generated using the mobile calendar application.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards enabling file attachments in mobile applications that otherwise do not have the ability to access such file attachments.

A first aspect described herein provides a method of receiving, by a mobile computing device, a message comprising an electronic calendar invitation and an electronic file attachment. An association may be generated between the electronic file attachment received in the message and a calendar event of an electronic calendar mobile application executing on the mobile computing device such that the calendar event is associated with the electronic calendar invitation. In response to receiving a selection to display the calendar event in the electronic calendar mobile application, a display of the calendar event may be generated. The calendar event display may comprise a display of the associated electronic file attachment in the electronic calendar mobile application.

In some embodiments, the electronic file attachment may be stored to a memory location of the mobile computing device. A link may be generated within the calendar event to the memory location such that the display of the electronic file attachment within the calendar event is a display of the electronic file attachment stored in the memory location. In response to receiving a selection to display the electronic file attachment in the electronic calendar application, the electronic file attachment stored in the memory location may be retrieved for display in the electronic calendar mobile application.

In some embodiments, in response to determining that the electronic calendar invitation has been accepted, a response message may be transmitted accepting the calendar invitation. The association between the electronic file attachment and the calendar event may be generated in response to transmitting the response message. In response to transmitting a response message accepting the calendar invitation, a calendar event may be generated in the electronic calendar mobile application. The mobile computing device may instruct a mobile data synchronization application to use the association between the electronic file attachment and the calendar event to generate a link to the electronic file attachment in the calendar event.

In some embodiments, a mobile data synchronization application may be instructed to transmit the association between the electronic file attachment and the calendar event to a computing device remotely located from the mobile computing device. The mobile data synchronization application may be further to store the association in a user directory on the remotely located computing device such that the user directory corresponds to a user account to which the message was addressed. The association between the electronic file attachment and the calendar event may be further generated by identifying a unique identifier associated with the received message from a messaging protocol of the received message. A link may be generated to the electronic file attachment in the calendar event by including the unique identifier in an electronic calendar protocol associated with the calendar event to generate the association.

In some embodiments, it may be determined whether the calendar event associated with the electronic calendar invitation previously exists in the electronic calendar mobile application. In response to determining that the calendar event associated with the electronic calendar invitation previously exists in the electronic calendar mobile application, it may be further determined whether the previously existing calendar event is associated with the electronic file attachment. The association between the electronic file attachment received in the message and the calendar event may be generated in response to determining that the previously existing calendar event is not associated with the electronic file attachment.

In some embodiments, an additional message may be received including an updated electronic file attachment. The association between the electronic file attachment and the calendar event may be modified to associate the calendar event in the electronic calendar mobile application with the updated electronic file attachment.

In some embodiments, it may be determined whether the calendar event associated with the electronic calendar invitation previously exists in the electronic calendar mobile application. In response to determining that the calendar event does not exist, the electronic file attachment may be stored into a pending calendar event database such that the association between the electronic file attachment received in the message and a calendar event in an electronic calendar mobile application is generated in response to determining that the calendar event has been generated in the electronic calendar mobile application.

In some embodiments, the mobile data synchronization application may be instructed to store the electronic file attachment on a server remotely located from the mobile computing device. The mobile data synchronization application may be instructed to store the association in a user directory on the remote server such that the user directory corresponds to a user account to which the message was addressed.

An additional aspect described herein provides an apparatus having at least one or more processors, or more display screens, and or more memory storing computer-readable instructions that, when executed by at least one of the processors cause the apparatus to perform the method set forth above.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
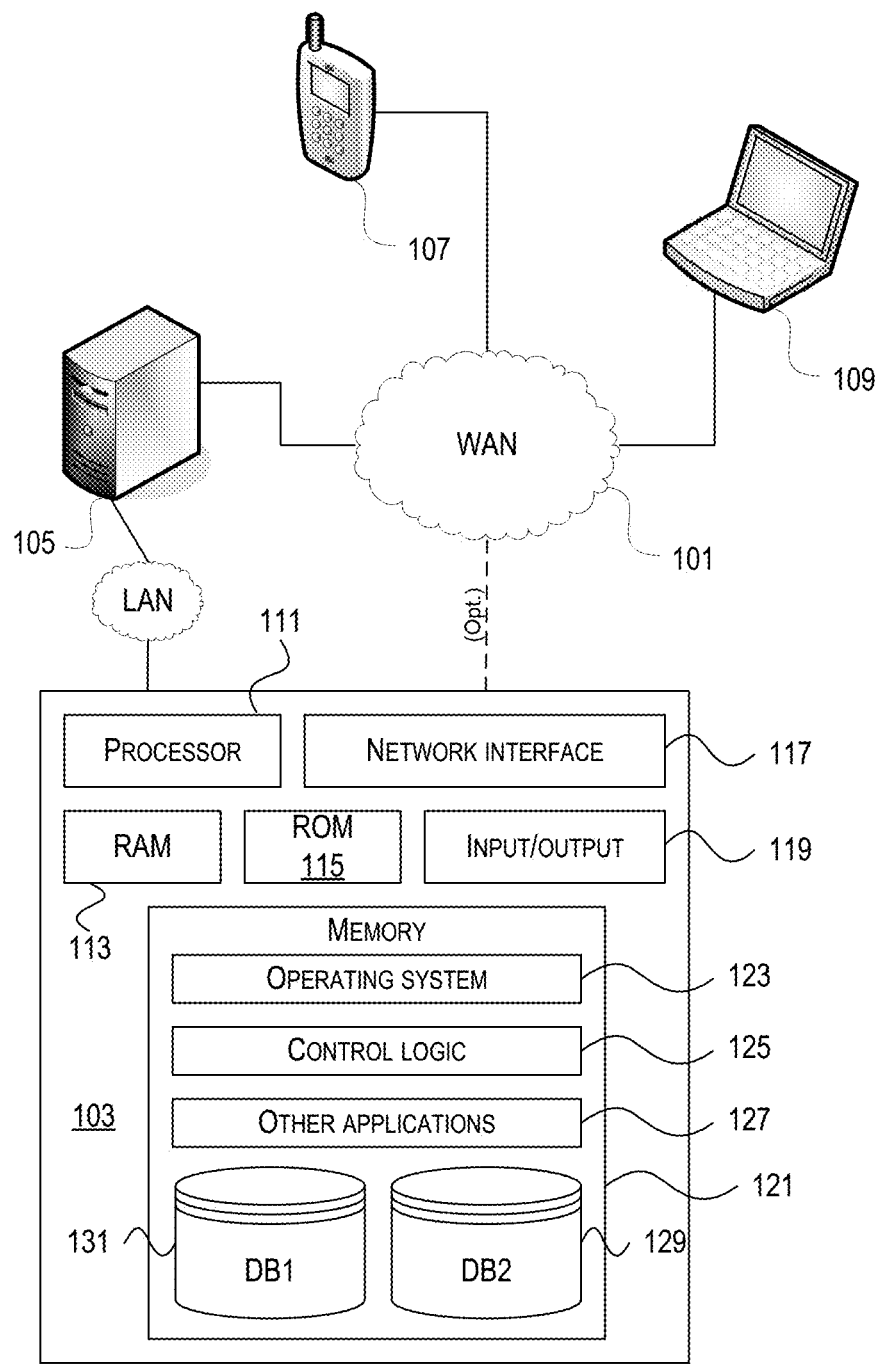
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards enabling file attachments in mobile applications that otherwise do not have the ability to access such file attachments. Mobile applications may rely on a data synchronization application such as Microsoft ActiveSync, Windows Mobile Device Center, and Google Sync to synchronize their application data with other instances of such mobile applications executing on different mobile devices, with desktop applications and/or with remote servers. For example, a mobile calendar application may use Microsoft ActiveSync to synchronize calendar appointments, contact information, and meeting information with one or more mobile device, remote server (e.g., Microsoft Exchange server, ShareFile server), and/or desktop calendar applications. Such mobile calendar application may retrieve user calendar data from multiple different online calendar accounts (e.g., multiple Google Calendar accounts, multiple Microsoft Exchange accounts, WorxMail account from Citrix etc.) and display such accumulated calendar data in one mobile application. Currently, mobile calendar applications do not allow file attachments to be viewed on mobile devices because mobile device data synchronization applications such as Microsoft ActiveSync do not allow file attachment synchronization on mobile calendar applications. Lack of access to file attachments in mobile calendar applications leads to a great degree of inconvenience for users who cannot access file attachments attached to calendar appointments on their mobile devices. Such users have to find access to a desktop computer to be able to view such file attachments by opening desktop calendar applications or desktop email applications that currently allow access to file attachments in calendar appointments.

The present disclosure describes methods and systems for enabling access to file attachments in mobile calendar applications. The file attachments that are associated with a calendar event may be retrieved by the mobile device itself from an email message containing the file attachment and the corresponding calendar event invitation used to generate the calendar event in the mobile calendar application. The mobile device may store such a retrieved file attachment locally to a memory unit. The mobile device may generate an association between the locally stored file attachment and the corresponding calendar event and generate a link in the calendar event to the locally stored file attachment. Accordingly, the mobile device may gather data calendar and file attachment data and modify the calendar event in the mobile calendar application to generate the file attachment.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Data server 103 may be a mobile device connected to web server 105 and client computers 107 and 109 through network 101. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
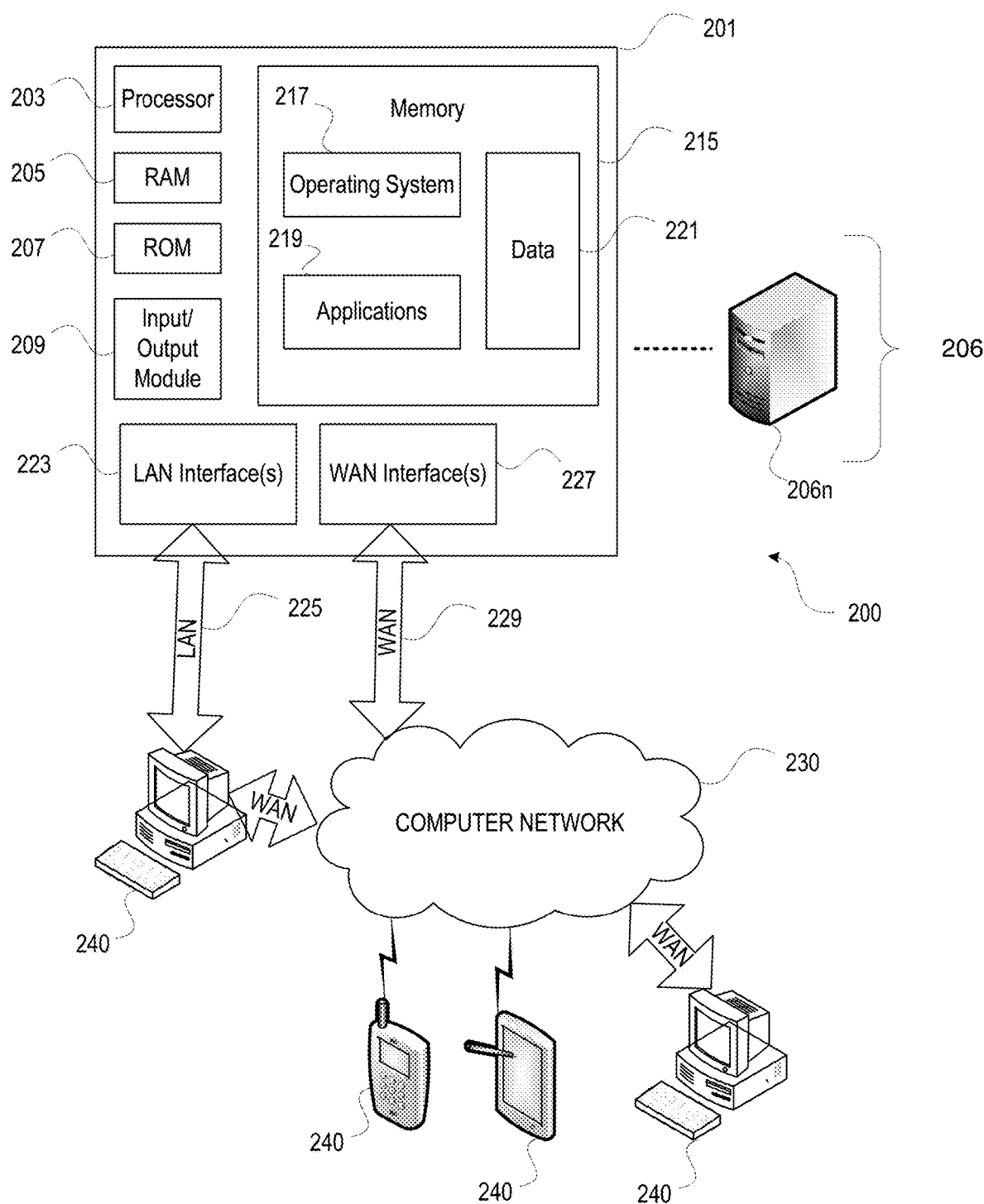
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be a mobile computing device configured to provide access to managed applications to its users in a secure environment. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206. In some embodiments, computing device 201 may be a mobile client device in communication with other client machine(s) 240.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 as well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
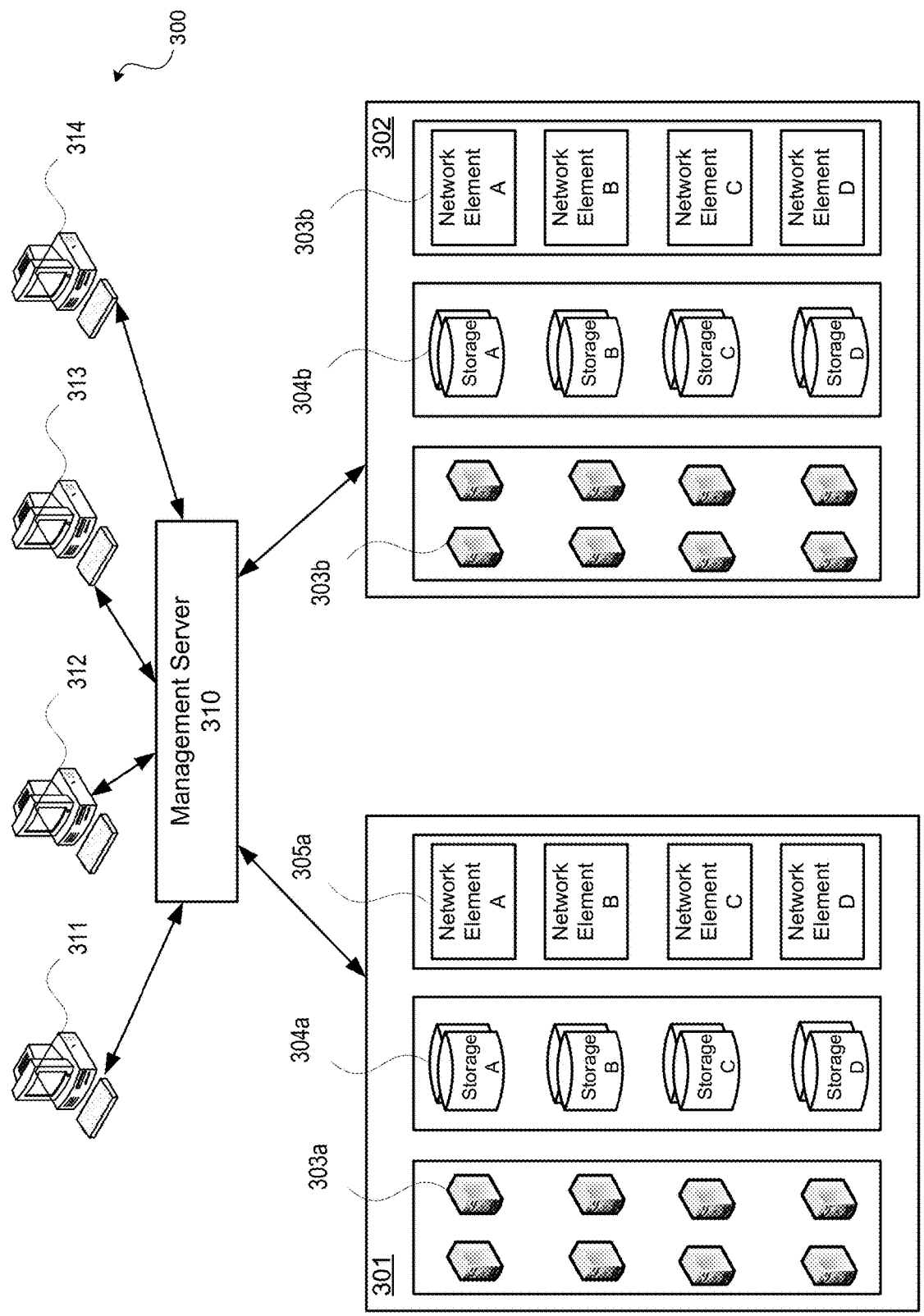
FIG. 3 depicts an illustrative cloud-based system architecture that may be used in accordance with one or more illustrative aspects described herein.

With further reference to FIG. 3, some aspects described herein may be implemented in a cloud-based environment. FIG. 3 illustrates an example of a cloud computing environment (or cloud system) 300. As seen in FIG. 3, client computers 311-314 may communicate with a cloud management server 310 to access the computing resources (e.g., host servers 303, storage resources 304, and network resources 305) of the cloud system.

Management server 310 may be implemented on one or more physical servers. The management server 310 may run, for example, CLOUDSTACK by Citrix Systems, Inc. of Ft. Lauderdale, Fla., or OPENSTACK, among others. Management server 310 may manage various computing resources, including cloud hardware and software resources, for example, host computers 303, data storage devices 304, and networking devices 305. The cloud hardware and software resources may include private and/or public components. For example, a cloud may be configured as a private cloud to be used by one or more particular customers or client computers 311-314 and/or over a private network. In other embodiments, public clouds or hybrid public-private clouds may be used by other customers over an open or hybrid networks.

Management server 310 may be configured to provide user interfaces through which cloud operators and cloud customers may interact with the cloud system. For example, the management server 310 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 310 also may include a set of APIs and/or one or more customer console applications with user interfaces configured to receive cloud computing requests from end users via client computers 311-314, for example, requests to create, modify, or destroy virtual machines within the cloud. Client computers 311-314 may connect to management server 310 via the Internet or other communication network, and may request access to one or more of the computing resources managed by management server 310. In response to client requests, the management server 310 may include a resource manager configured to select and provision physical resources in the hardware layer of the cloud system based on the client requests. For example, the management server 310 and additional components of the cloud system may be configured to provision, create, and manage virtual machines and their operating environments (e.g., hypervisors, storage resources, services offered by the network elements, etc.) for customers at client computers 311-314, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 311-314 may be related, for example, different client computers creating virtual machines on behalf of the same end user, or different users affiliated with the same company or organization. In other examples, certain clients 311-314 may be unrelated, such as users affiliated with different companies or organizations. For unrelated clients, information on the virtual machines or storage of any one user may be hidden from other users.

Referring now to the physical hardware layer of a cloud computing environment, availability zones 301-302 (or zones) may refer to a collocated set of physical computing resources. Zones may be geographically separated from other zones in the overall cloud of computing resources. For example, zone 301 may be a first cloud datacenter located in California, and zone 302 may be a second cloud datacenter located in Florida. Management sever 310 may be located at one of the availability zones, or at a separate location. Each zone may include an internal network that interfaces with devices that are outside of the zone, such as the management server 310, through a gateway. End users of the cloud (e.g., clients 311-314) might or might not be aware of the distinctions between zones. For example, an end user may request the creation of a virtual machine having a specified amount of memory, processing power, and network capabilities. The management server 310 may respond to the user's request and may allocate the resources to create the virtual machine without the user knowing whether the virtual machine was created using resources from zone 301 or zone 302. In other examples, the cloud system may allow end users to request that virtual machines (or other cloud resources) are allocated in a specific zone or on specific resources 303-305 within a zone.

In this example, each zone 301-302 may include an arrangement of various physical hardware components (or computing resources) 303-305, for example, physical hosting resources (or processing resources), physical network resources, physical storage resources, switches, and additional hardware resources that may be used to provide cloud computing services to customers. The physical hosting resources in a cloud zone 301-302 may include one or more computer servers 303. The physical network resources in a cloud zone 301 or 302 may include one or more network elements 305 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 301-302 may include storage disks (e.g., solid state drives (SSDs), magnetic hard disks, etc.) and other storage devices.

In some embodiments, client computers 311-314 may communicate with management server 310 to retrieve and synchronize application data. Application data for one or more mobile applications executing on any one of client computers 311-314 may be synchronized with user account information and application data stored in the management server 310. For example, a user's calendar appointments may be stored in a user account on the management server 310. The user may access such calendar application data stored in the management server 310 on a calendar application executing on any one of client computers 311-314. Furthermore, a user may also modify application data stored in the management server 310 as a virtue of operations performed on the application in any of client computers 311-314. The application executing on any one of client computers 311-314 may be an interface to access and modify application data that may be stored on the management server 310. A synchronization software such as Microsoft ActiveSync may enable application data stored in the management server 310 to be accessed and modified by an application executing on any one of client computers 311-314.

Enterprise Mobility Management Architecture

Figure 4:
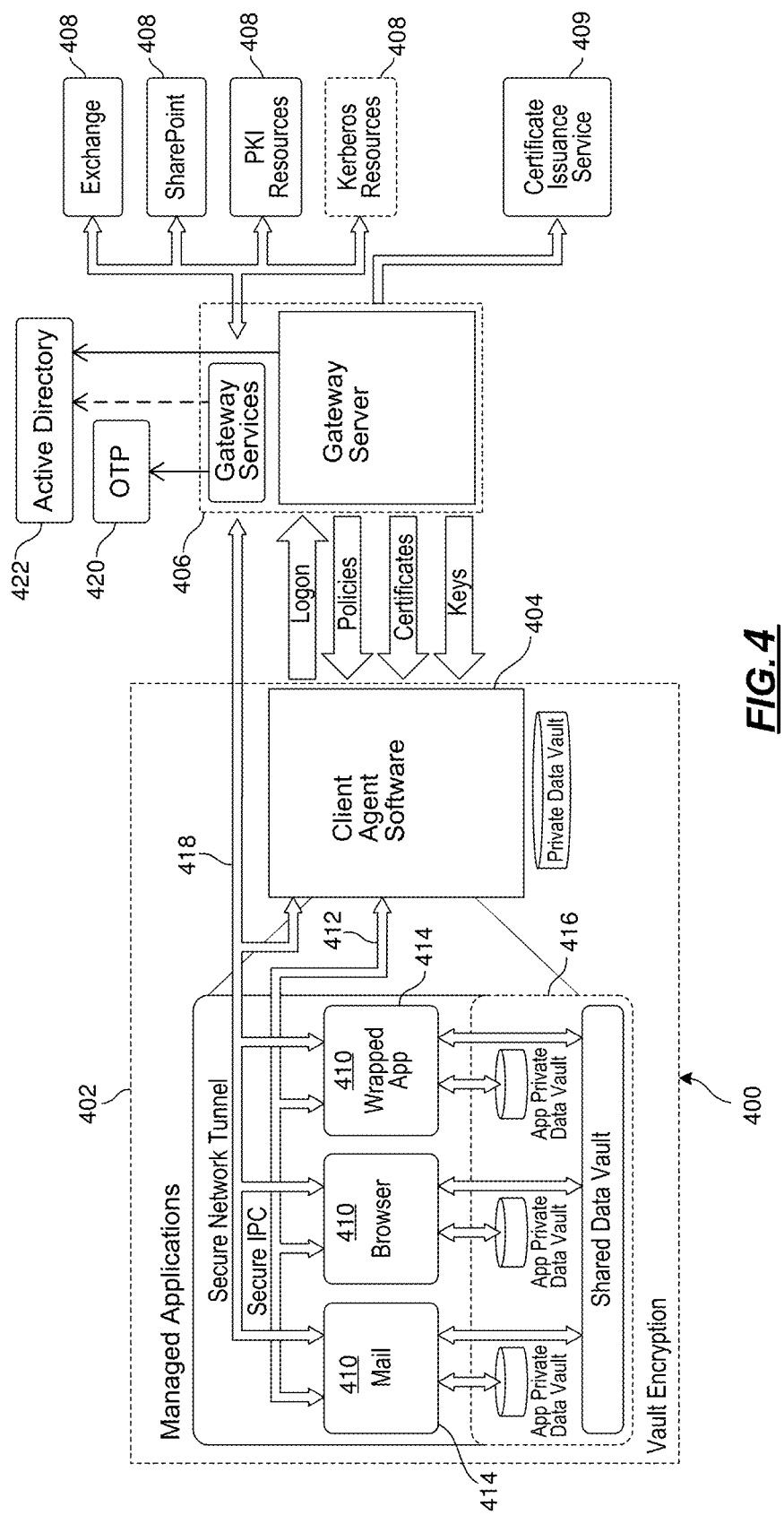
FIG. 4 depicts an illustrative enterprise mobility management system in accordance with one or more illustrative aspects described herein.

FIG. 4 represents illustrative enterprise mobility management system 400. The enterprise mobility management system 400 enables a user of a mobile device 402 to both access enterprise or personal resources from a mobile device 402 and use the mobile device 402 for personal use. The user may access such enterprise resources or enterprise services using a mobile device 402 that is purchased by the user or a mobile device 402 that is provided by the enterprise to user. The user may utilize the mobile device 402 for business use only or for business and personal use. The mobile device may run an iOS operating system, and Android operating system, or the like. The enterprise may choose to implement policies to manage the mobile device 402. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. The mobile device 402 that is managed through the application of mobile device management policies may be referred to as an enrolled device.

In some embodiments, the operating system of the mobile device may be separated into a managed partition and an unmanaged partition. The managed partition may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, calendar applications, web browsing applications, software-as-a-service (SaaS) access applications, Windows Application access applications, and the like. The secure applications may be secure native applications, secure remote applications executed by a secure application launcher, virtualization applications executed by a secure application launcher, and the like. The secure native applications may be wrapped by a secure application wrapper. The secure application wrapper may include integrated policies that are executed on the mobile device 402 when the secure native application is executed on the device. As yet another example, the enterprise may have an application that maintains highly secured data (e.g., human resources data, customer data, and engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

An enrolled mobile device 402 with a client agent 404 may interacts with gateway server 406 (which includes Access Gateway and application controller functionality) to access various enterprise resources 408 and services 409 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (e.g., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to enabling file attachments to be accessed in certain mobile applications such as a mobile calendar application. Mobile applications such as an electronic calendar may communicate with other mobile applications executing on a mobile device such as an email application and with one or more remote servers to access user application data (e.g., a user's email account information maintained on a remote Exchange server). The mobile calendar application may synchronize its data with mobile applications on the same device or different mobile device, desktop applications, and application databases stored on remote servers using a data synchronization application (e.g., Microsoft Activesync). By communicating with mobile applications on the same mobile device as the mobile calendar application and by communicating with remote servers maintaining user account data, the mobile device may retrieve information needed by the mobile calendar application to generate associations between file attachments present in a user's calendar events stored on the remote server and/or a desktop calendar application. Upon retrieving such file attachments, the mobile device may modify the calendar event in the mobile calendar application to access the file attachment. For example, the mobile device may generate an association between the calendar event and the file attachment and may modify the calendar event information on the mobile calendar application to display the newly associated file attachment in the mobile calendar application's corresponding calendar event.

Illustrative Embodiments

Figure 5:
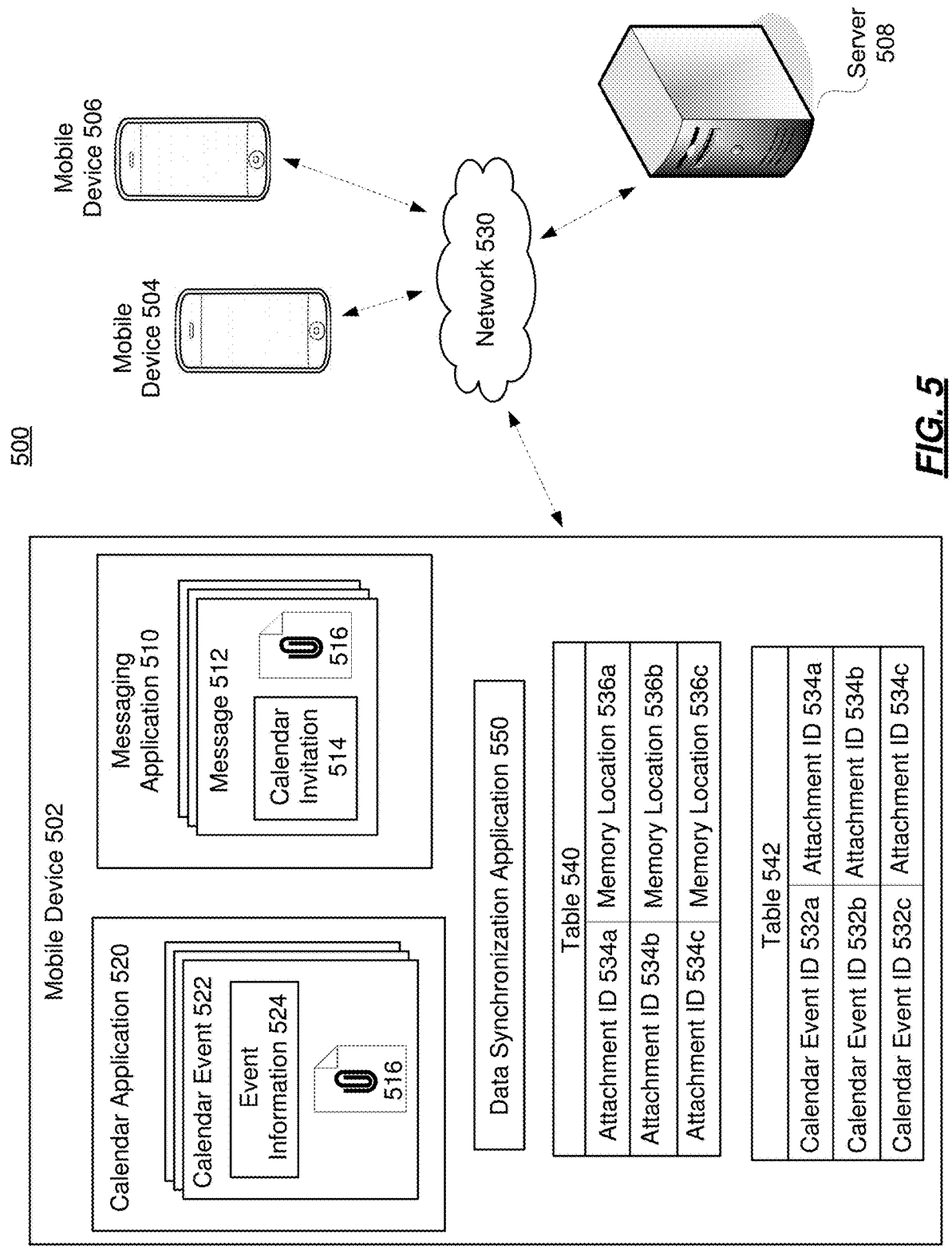
FIG. 5 is a diagram of an illustrative computing environment for providing mobile applications that previously did not have access to file attachments with the ability to access file attachments, in accordance with one or more illustrative aspects described herein.

FIG. 5 shows an illustrative computing environment 500 for providing mobile applications that previously did not have access to file attachments with the ability to access file attachments. A mobile messaging application 510 and a mobile calendar application 520 may execute on a mobile computing device 502, also referred to herein as mobile device 502. Mobile device 502 may correspond to the client device 107 as described in FIG. 1 and/or the generic computing device 201 or the client machine 240 described in FIG. 2, any one of the client computers 311-314 described in FIG. 3, and/or the mobile device 402 described in FIG. 4. The mobile device 502 may receive messages such as message 512 in the messaging application 510 by synchronizing the messaging application 510 with a remote server 508 over network 530. The network 530 may correspond to the network 101 and/or the network 230 described in FIG. 2. The mobile device 502 may maintain updated calendar events such as calendar event 522 in the mobile calendar application 520 by synchronizing the calendar application 520 with a remote server 508 that contains updated calendar information. The remote server 508 may correspond to the data server 103 and/or the web server 105 described in FIG. 1, and/or the server 206 described in FIG. 2, and/or the management server 310 described in FIG. 3. The messaging application 510 and mobile calendar application 520 may be synchronized with server 508 and also other mobile devices 504 and 506 over network 530 through the data synchronization application 550 executing on the mobile device 502.

The messaging application 510 executing on mobile device 502 may receive messages such as message 512. The messaging application 510, while described here as an email messaging application, might not be limited to email messaging applications. For example, the messaging application 510 may be a text messaging mobile application, a multimedia messaging service (MMS) mobile application, a video messaging application, and an instant messaging (IM) mobile application. The mobile messaging application 510 may receive messages such as message 512 from email servers such as server 508. The mobile messaging application 510 may receive messages from one or more email accounts from different email servers and/or different email users. The mobile messaging application 510 may include one or more accounts in which messages from the corresponding accounts are stored in the mobile device 502. The mobile messaging application 510 may communicate with the data synchronization application 550 to continuously receive updates from one or more email accounts associated with the user of the mobile device 502. The mobile messaging application 510 may synchronize its activity with other mobile devices 504 and 506 on which the same mobile messaging application 510 with one or more of the same email accounts are executing using the data synchronization application 550. For example, if the mobile messaging application 510 receives an email from an email server 508, transmits an email, generates a draft, flags a message 512, moves a message from one folder to another folder, and/or performs any such action on messages within the mobile messaging application 510 executing on the mobile device 502, the data synchronization application 550 may reflect such a change in mobile devices 504 and 506's mobile messaging applications. Such a change made to the messages in the mobile messaging application 510 may be reflected in the other devices mobile messaging applications and the messaging account application data stored in the server 508 as the data synchronization application 550 executing on mobile device 502 communicates with data synchronization applications or similar agents executing on mobile devices 504 and 506 and server 508. The data synchronization application may update each of the different folders of each email account executing in the mobile messaging application 510 on messaging applications executing on different user devices that access the one or more message accounts that are executing on the mobile device 502. The mobile messaging application 510 may also allow the user to view and/or modify any file attachments such file attachment 516 attached to message 512. The mobile messaging application 510 may allow the user of the mobile device 502 to attach any file and/or link to any message composed on the mobile device 502 that the mobile device 502 has access to.

The mobile calendar application 520 executing on mobile device 502 may include one or more calendar events such as calendar event 522. Each calendar event may include event information 524 identifying one or more of the participants, location, title, and/or time of the calendar event 522 as well as any notes or text associated with the calendar event 522. The calendar event 522 may also display one or more file attachments associated with the calendar event 522. Generation of the file attachment 516 in calendar event 522 will be discussed in greater below. The mobile calendar application 520 may receive messages from one or more of the user's calendar accounts from different calendar applications and/or different servers. For example, the mobile calendar application 520 may include calendar events from a user's Exchange account, the user's Google calendar, calendar events generated on the local calendar application itself on the mobile device 502. The mobile calendar application 520 may include one or more accounts in which calendar events from the corresponding accounts are stored in the mobile device 502. For example, the calendar events from different user accounts may be tagged to identify the application calendar source (e.g., Exchange account, Google calendar, etc.). The mobile calendar application 520 may communicate with the data synchronization application 550 to continuously receive updates from one or more email accounts associated with the user of the mobile device 502. The mobile calendar application 520 may synchronize any changes made to its calendar events with the appropriate calendar accounts. For example, changes made to a calendar event may be reflected on other mobile devices 504 and 506 on which the same mobile calendar application 520 with one or more of the same calendar accounts are executing. Such changes to calendar events may be synchronized with other mobile calendar applications using the data synchronization application 550. For example, once the mobile messaging calendar 520 has generated a new calendar event for a given calendar account on mobile device 502, generates a draft calendar event that has not been sent to its participants, flags a calendar event 522, adds additional participants to a calendar event 522, changes the time or location of a calendar event 522, accepts or declines calendar event 522, and/or performs any such action on calendar events within the mobile calendar application 520 executing on the mobile device 502, the data synchronization application 550 may reflect such a change in mobile devices 504 and 506's mobile calendar applications and the calendar account application data stored in the server 508 by communicating with data synchronization applications or similar agents executing on mobile devices 504 and 506 and server 508. The mobile calendar application 520 may also allow the user to view and/or modify any file attachments such file attachment 516 attached to calendar event 522. The mobile messaging application 510 may allow the user of the mobile device 502 to attach any file and/or link that the mobile device 502 has access to any calendar event composed on the mobile device 502.

Server 508 may be a remotely located server that stores multiple users' application data. For example, the server 508 may maintain records of each user's calendar events, messages, tasks, contact lists, etc. Although in the example embodiment shown in FIG. 5, only one server 508 is shown, the mobile device 502 may communicate with multiple different servers with access to different email accounts and calendar accounts. Each server may have a service executing on it that communicates with data synchronization application 550 to synchronize the application data on each device. A server program such as Microsoft Exchange Server or Open X-change, which includes calendaring software, contacts and task manager, and a mail server, may execute on server 508. The server 508 may receive mail from several different computing devices over network 530 to be forwarded to mobile device 502. The server 508 may maintain records of each of its users' accounts and include updated messages, calendar events, tasks, contacts, and other application data associated with each user account. The server 508 may continuously synchronize such application data with each computing device it has access to that is executing a messaging application and/or calendar application with a user account that the server 508 maintains records for. For example, the server 508 may synchronize messages for an Exchange account that mobile device 502 is associated with. When the server 508 receives any new messages for that particular account, any updates to the messaging account's folders, or any change in the messaging application's data for that given account from one or more computing devices, the server 508 may communicate with data synchronization application 550 executing on the mobile device 502 to communicate such a change to the messaging application 510.

When a mobile device 502 initially installs and/or registers a messaging and/or calendar account with messaging application 510 and/or calendar application 520, the mobile device 502 communicates with the server 508 via the data synchronization application 550 to register mobile device 502's messaging application 510 and/or calendar application 520 with the server 508. First, the mobile device 502 may identify the server 508 that includes a server program that maintains records on the user account that the mobile device 502 is being registered with. The server program may be Microsoft Exchange Server or any other mail server software that implements the Exchange ActiveSync protocol. Upon identifying the appropriate server 508, the data synchronization application 550 executing on mobile device 502 may transmit, to server 508, a request to register mobile device 502's messaging application 510. In response to such a request, the server 508 may transmit a list of policies the mobile device 502 must apply in order for the server 502 to communicate its secure application data with the mobile device 502. For example, in order for the mobile device 502 to communicate with server 508, the server 508 may request that the mobile device 502 be compliant with the server 508's security policies. The server 508 may request that the mobile device 502 encrypt its device storage, enforce a PIN code to unlock the mobile device 502 etc. The data synchronization application 550 may instruct a processor of the mobile device 502 to execute all such requested policies. Once the mobile device 502 has applied such requested policies, the data synchronization application 550 may transmit an indication to the server 508 that all requested policies have been enforced on the mobile device 502. Upon receiving such a notification of policy enforcement, the server 508 may transmit, to the mobile device 502, a list of application data folders that the data synchronization application 550 can synchronize on the messaging application 510. Such application data folders may include the inbox folder containing all messages received in the messaging account, the calendar folders comprising all calendar information of the user's account, contact folders comprising all contact information stored in the user's account, and tasks folders comprising all of the tasks that the user may have set for his user account. Upon receiving such a list of folders, the data synchronization application 550 may map each folder with a mobile application. For example, the data synchronization application may map the inbox folder to the messaging application 510, the calendar folder to the calendar application 520, the contacts folder to a mobile contact management application, and the task folder to a mobile task management and/or reminder application. The data synchronization application may request the content of each such relevant folder from the server 508 upon mapping each folder to a mobile application on the mobile device 502. For example, the data synchronization application 550 may request all emails in the inbox folder of the server 508's account data to be transmitted to the messaging application. The server 508 may transmit all required application data (e.g., messages, calendar events, tasks, and contacts) to the mobile device 502. Once the data synchronization application 550 has synchronized mobile applications executing on mobile device 502 with application data in server 508, the data synchronization application 520 may use direct push technology to receive updates from the mail server 508 as changes to the application data (new email messages, calendar event updates, email messages sent by the user on a different computing device etc.) are received by the server 508.

The mobile device 502 may monitor incoming messages in the messaging application 510 to determine if a message such as message 512 that includes a calendar invitation 514 has been received in the mobile messaging application 510. If such a message has been received at the mobile device 502, the mobile device 502 may generate a calendar event 522 for calendar invitation 514 if one does not already exist. In some embodiments, the mobile device 502 may generate a calendar event 522 if the user has responded to message 512 accepting the calendar invitation 514. For example, by monitoring sent emails or emails in an outbox folder of the messaging application 510, the mobile device 502 may determine that the user of mobile device 502 has accepted the calendar invitation by identifying an outgoing or sent message addressed to the organizer of calendar invitation 514 (and/or the author of the message 512). Upon identifying that the sent message includes an acceptance to calendar invitation 514, the mobile device 502 may generate a calendar event 522 corresponding to the calendar invitation 514 in the mobile calendar application.

In some embodiments, calendar events such as calendar event 522 may be generated in the mobile calendar application 520 from information present in an accepted calendar invitation 514. The mobile device 502 may identify event information 524 of the calendar event 522 that is to be generated (e.g., title, location, time, participants, etc. of the calendar event 522) from the calendar invitation 514 present in the messaging application 510. Once the mobile device 502 detects that a message 512 with calendar invitation 514 has been received, the mobile device 502 may check to see if a calendar event already exists in the calendar application 520 with event information that matches the details of calendar invitation 514 and/or an identifier present in the calendar invitation 514. For example, each calendar event that is generated may share an identifier in common with the corresponding calendar invitation from which it was generated. If no calendar event exists in the calendar application 520 with the same identifier as the calendar invitation 514, then a new calendar event 522 may be generated in the calendar application 520 according to the details specified in the calendar invitation 514. The calendar event 522 may be associated with the same identifier as the calendar invitation 514. However, if a calendar invitation 514 with the same identifier as a preexisting calendar event is received at the mobile device 502 with updated calendar event information (e.g., at least one of the title, location, time, participant information, file attachment or related text has been modified), the mobile device 502 may identify the corresponding calendar event associated with the modified calendar invitation and update the corresponding calendar event with the updated calendar event information.

In some embodiments, the identifier shared by a calendar event 522 and its corresponding calendar invitation 514 received in message 512 from which the calendar event was generated, may also be shared by the message 512 and any file attachments such as attachment 516 included in the message 512. Each calendar event may be associated with such an identifier. Even if the initial message containing the calendar invitation 514 and file attachment 516 is deleted, a subsequently received message with updated details may include the same identifier or an indication that the subsequent message is modifying event details for a calendar invitation 514 with a given identifier. Accordingly, such an identifier may be referenced by the mail application 510, calendar application 520, data synchronization application 550, and server 508 to associate related messages, file attachments, and calendar invitations in the messaging application 510 with their corresponding calendar events in the calendar application 520.

In some embodiments, the mobile device may generate a pending calendar event 522 in a pending calendar database upon determining that message 512 including the calendar invitation 514 and/or file attachment 516 has been received but that the user has not yet accepted the calendar invitation 514 (e.g., responded to the message 512 accepting the calendar invitation 514). If such a determination is made, the mobile device 502 may generate the calendar event 522 in a pending calendar event database and include the pending calendar event 522 in the calendar application 520 with an indication that the calendar event 522 has not yet been accepted by the user. For instance, the calendar event 522 may be grayed out or may have another visual indicator indicating that the calendar event 522 has not yet been accepted. Once the mobile device determines that the calendar invitation 514 has been accepted (e.g., determines that the user sends a response message to the organizer of the calendar invitation 514 accepting the invitation), the mobile device 502 may convert the pending calendar event 522 into an accepted event. However, if the mobile device 502 determines that the message has been declined by the user (e.g., determine that the user replies to message 512 declining the calendar invitation 514), the mobile device may remove the pending calendar event 522 from the pending calendar event database and remove the pending calendar event from being displayed in the calendar application.

In some embodiments, once the mobile device 502 receives message 512 with the calendar event, the mobile device 502 may check the contents of message 512 to determine if there is an electronic file attachment included in the message 512 for inclusion in a calendar event 522 that is to be generated based on details found in the message 512. Upon determining that such a file attachment is included in the message 512, the mobile device 502 may download such a file attachment to a memory unit of the mobile device 502.

Additionally, the mobile device 502 may determine if the message 512 includes links to file attachments that are stored on a remote computing device. If the message 512 includes a link to a remotely stored file attachment, the mobile device 502 may access the remotely stored file and download it onto a memory unit of the mobile device 502.

In some embodiments, before the mobile device 502 includes file attachments in the calendar event 522, the mobile device 502 may instruct the data synchronization application 550 to determine whether desktop computing devices with access to the same calendar account(s) and/or mail account(s) that mobile device 502 accesses already have a calendar event 522 generated and if they do, which file attachments are associated with such a calendar event. By determining which file attachments are already included in the calendar event 522 on other desktop computing devices that have access to the same calendar account as the calendar application 520, the mobile device 502 may identify which file attachments to use for generating file attachments in the calendar event 522 for display on the mobile device 502's calendar application 520. The mobile device 502 may request these desktop computing devices that already have the file attachment associated with the corresponding calendar event 522 to send the file attachment for download to mobile device 502. The mobile device 502 may retrieve and store the document in a local memory unit.

In some embodiments, the mobile device 502 may generate an association between an electronic file and a calendar event in order to create a file attachment within the calendar event 522 in the mobile calendar application 520. Once the electronic files such as file 516 attached to message 512 with calendar invitation 514 are retrieved by the mobile device 502, the mobile device 502 may update a data structure such as table 540 identifying the memory locations in which such electronic files are stored so that they can be easily accessed. Table 540 may include associations between electronic file attachments and memory locations at which such files are stored. In the association between a file attachment and the corresponding memory location, the file attachment may be referred using the identifier shared by the message in which the file attachment is originally found on the mobile device. For example, file attachment 516, calendar invitation 514, and message 512 may share identifier 534*a*. The file attachment 516 may be downloaded to memory location 536*a*. Accordingly, an entry in table 540 may associate the file attachment identifier 534*a* with memory location 536*a*. Similarly, table 540 may include multiple other such associations between attachment identifiers such as 534*b* and 534*c* and the corresponding memory locations in which they are stored such as 536*b* and 536*c*.

In some embodiments, the mobile device 502 may generate associations between file attachments and the corresponding calendar events in which such file attachments will be attached. For example, the mobile device 502 may generate a table 542 associating each electronic file attachment with the calendar event that it is determined to be included in. The mobile device 502 may determine that the calendar event that has been generated by or modified by the message including the file attachment and calendar invitation will be associated with the file attachment(s) found in that message. For example, the mobile device 502 may determine that the calendar event 522 is generated from calendar invitation 514 found in message 512 and will be associated with file attachment 516 found in message 512. Accordingly, the mobile device may identify that calendar event identifier 532*a*, which is the calendar event identifier for calendar event 522, is to be associated with attachment identifier 534*a*, which is the identifier for attachment 516. The mobile device 502 may store multiple different associations between other calendar events' identifiers such as calendar event identifiers 532*b* and 532*c* and the corresponding file attachment identifiers 534*b* and 534*c* that have been determined to be included in those calendar events.

The mobile device may continuously monitor the status of the calendar events to update tables 540 and 542. Upon determining that the pending calendar event 522 has been declined, the mobile device 502 may delete any associated attachments associated with the pending calendar event 522 that may been downloaded to the mobile device 502 and may remove any entries from tables 540 and 542 related to the declined calendar event. If the mobile device determines that a new message comprising a calendar invitation and a file attachment(s) has been received, the mobile device may generate new entries in tables 540 and 542 upon downloading the file attachment(s).

The mobile device 502 may generate a display of the attachment within its corresponding calendar event. Once a calendar event is selected for display, the mobile device 502 may access table 542 and determine if the selected calendar event has an associated file attachment. If the mobile device 502 determines that an entry for the selected calendar event exists, the mobile device may use the associated attachment identifier retrieved from table 542 to identify the memory location at which the attachment is stored by performing a table lookup in table 540 using the attachment identifier found from table 540. Once the memory location of the relevant file attachment has been found, the mobile device 502 may include a link to the identified memory location in the selected calendar event. For example, the mobile device 502 may generate a display of an icon for a file attachment in the calendar event selected for display in the calendar application 520. The file attachment icon may comprise an embedded link to the identified memory location at which the file attachment is stored. Upon determining that the user has selected the file attachment icon for display within the displayed calendar event, the mobile device 502 may open the link and generate a display of the file attachment stored in the memory location specified in the link. The mobile device 502 may generate such a display within the displayed calendar event.

The mobile device 502 may also allow the file attachment to be modified within the calendar event itself. For example, the mobile device 502 may allow the user to edit the file attachment stored in the memory location. Once the mobile device 502 displays the file attachment 516 within calendar event 522, the user may have the option to open the file attachment and edit it. The modified file attachment may be saved and synchronized, using the data synchronization application 550, amongst all of the computing devices that have access to the calendar account executing on the mobile calendar application 510, via server 508. For example, the mobile device 502 may instruct the data synchronization application 550 to update the server 508 with the updated file attachment. In some embodiments, once the attachment has been edited on mobile device 502, the user of the mobile device 502 may be presented with an option to share the modified file attachment with all other participants of the calendar event comprising the file attachment. For example, upon detecting that any one of the participants has modified the file attachment in their own calendar application 520, the corresponding computing device may present an option to the user to send a calendar event update to the other participants of the calendar event. The calendar event update may include the updated file attachment. When each of the participants receives the calendar event update, the file attachment that may already have been stored to their local memory units may be updated with the updated file attachment.

In some embodiments, the user of the mobile device 502 may also be allowed to attach files to preexisting calendar events or new calendar events in their mobile calendar application 520. If the user adds an electronic file found on the mobile device 502 to a calendar event from within the mobile calendar application 520, the mobile device 502 may allow different computing devices accessing the same calendar account to view the electronic file added by the mobile device 502 within the same calendar event. For example, once mobile device 502 determines that a calendar event 522 has been modified with a new file attachment that was added locally from the memory of mobile device 502, the mobile device 502 may instruct data synchronization application 550 to update the calendar account at the server 508 with the file attachment. The mobile device 502 may instruct the data synchronization application 550 to retrieve the file from its memory location and transmit it to the server 508 and instruct the server to store the association between the calendar event and the file attachment for other computing devices to use.

In some embodiments, the same file attachments may be associated with multiple different calendar events. For example, a single file may be associated with a recurring calendar event. When an incoming message 512 is received, the calendar invitation may specify that the calendar invitation is for a recurring event. The file attachment 516 associated with the event may be applied to each instance of the recurring event. The association in table 542 may note that the calendar event identifier for the recurring event or for all instances of the recurring event may be associated with the file attachment received in the message 512 for association with the recurring event. If another message is received at the mobile device 502 modifying the details of a preexisting recurring calendar event, the mobile device 502 may determine whether the base event for the recurring event already is associated with the file attachment included in the received message. If base event is not previously associated with the file attachment in the updated calendar invitation of the updated message, the mobile device 502 may download the attachment from the updated message and generate an association between the file attachment and each of the calendar events including the base event of the recurring series of calendar events.

In some embodiments, a calendar event update may be received by the mobile device 502. For example, the mobile device 502 may receive a message including an updated calendar invitation specifying the identifier of the previously existing calendar event in the calendar application 520 that needs to be rescheduled. The mobile device 502 may check the preexisting calendar event corresponding to the updated calendar invitation to determine if there are any file attachments associated with the preexisting calendar events. If the mobile device 502 determines that file attachments are associated with the preexisting calendar events that are now subject to being rescheduled, the mobile device 502 modifies the link in the preexisting calendar event to the file attachment such that the file attachments are linked to the rescheduled calendar event that occurs at the time and location specified in the calendar event update.

Figure 6:
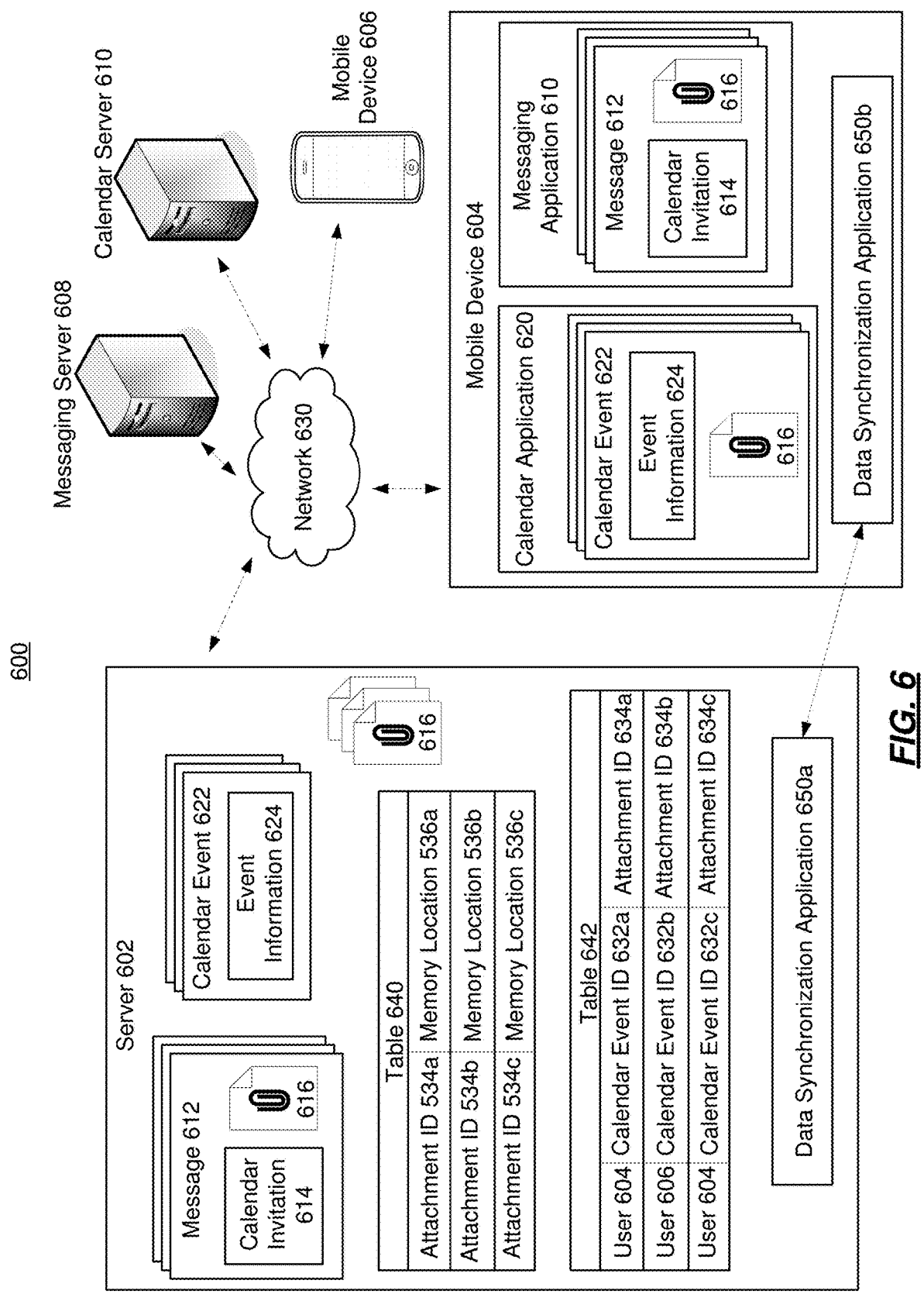
FIG. 6 is a diagram showing another illustrative computing environment for providing mobile applications with the ability to access file attachments, in accordance with one or more illustrative aspects described herein.

FIG. 6 shows an illustrative computing environment 600 for providing mobile applications with the ability to access file attachments. According to the embodiments described with relation to FIG. 6, a mobile computing device such as mobile device 604 and mobile device 606 may communicate with server 602 to generate and maintain associations between a user's calendar events. Mobile devices 604 and 606 may correspond to the client device 107 as described in FIG. 1 and/or the generic computing device 201 or the client machine 240 described in FIG. 2, any one of the client computers 311-314 described in FIG. 3, and/or the mobile device 402 described in FIG. 4, and/or the mobile device 502 described in FIG. 5. Server 602 may correspond to the data server 103 and/or the web server 105 described in FIG. 1, and/or the server 206 described in FIG. 2, and/or the management server 310 described in FIG. 3, and/or the server 508 described in FIG. 5.

Server 602 may include messages, calendar event information, tasks, contact lists, and other application data for multiple different user accounts. The server 602 may include multiple different messages such as message 612. Each message such as message 612 may include one or more of a calendar invitation 614 and file attachment 616. Each message may be associated with a user account and may also have a unique identifier that is shared by the calendar invitation and file attachment that it comprises. The server 602 may include multiple different calendar events such as calendar event 622 for each one of the multiple calendar accounts that the server 602 maintains. Each calendar event 622 may include one or event information 624 specifying the details of the calendar event (e.g., time, location, title, text, participant information etc.). Each calendar event may be associated with a user account and may also have a unique identifier.

The server 602 may communicate with one or more messaging server such as messaging server 608 and/or one or more calendar servers such as calendar server 610 in addition to communicating with desktop computing devices and mobile devices 604 and 606 over network 630. The messaging server 608 may provide the server 602 with messages from various different messaging accounts for each user. Similarly, the calendar server 610 may provide the server 602 with calendar events from various different calendar accounts for each user.

Mobile device 604 may have a mobile messaging application 610 and a mobile calendar application 620 executing on it. The mobile device 604 may synchronize messages and calendar events for the one or more accounts that it has access to with server 602 using the data synchronization application 650*b* executing on the mobile device 604. The data synchronization application 650*b* may communicate with a counterpart data synchronization application 650*a* executing on the server 602 to periodically synchronize messages, calendar events, and other application data with the server 602. The mobile device may generate calendar events such as calendar event 622 from a received message such as message 612 comprising a calendar invitation 614 and/or a file attachment 616. Calendar event generation from a message may occur on the mobile device 604 as described above in FIG. 5.

Server 608 may maintain records for each user's multiple messaging and calendar accounts. Any changes to application data for any one of such messaging and/or calendar events detected from the mobile devices 604 and 606 may be made to the application data maintained on the server 602. For example, if the server 602 detects that one of the messaging accounts that it manages is accessed by a messaging application 610 of mobile device 604 and that the user of mobile device 604 has made a change to a message 612 from the mobile device 604, the server 602 may reflect such a change in the application data it maintains for message 612. If the mobile device 602 adds a file attachment 616 or edits the content of the message 612, such a change may be reflected in the message 612 stored on the server 602. Once the server 602 receives a message such as message 612 from any computing device that it communicates with, the server 602 may determine if there are any file attachments included in the message 612. If an attachment 616 is detected in the incoming message 612, the server 602 may download the attachment 616 and store it in a memory location of the server 602. Multiple different file attachments may be stored in the server 602. The server 602 may keep track of the memory location at which each downloaded file attachment is stored in table 640. Table 640 may correspond to table 540 of FIG. 5.

In some embodiments, the server 602 may generate calendar events from messages with calendar invitations as described in greater detail above with relation to FIG. 5. The server 602 may generate associations between calendar events and attachments and store these associations in table 642. Each association between a calendar event and a file attachment may be tagged with an identifier for the user account that such an association corresponds to. For example, upon generating a calendar event 622 (having a calendar event identifier 632*a*) from user 604's message 612, the server 602 may generate an association between the attachment 616 (having an attachment identifier 634*a*) found in message 612 of the user 604's account. Such an association between the file attachment identifier and the calendar event identifier may be stored in table 642.

In some other embodiments, the server 602 may receive calendar events generated by different computing devices that it communicates with. For example, mobile device 604 may generate calendar event 622 from message 612. Mobile device 604 may generate associations between file attachments and calendar events. The mobile device 604 may instruct data synchronization application 650*b* to communicate with data synchronization application 650*a* executing on the server 602 to transmit such an associated that is generated at the mobile device 604 so that the association may be stored in table 642. The server 602 may store such associations that it receives from mobile device 604 and other computing devices and tags such associations with the corresponding user account to generate table 642.

The data synchronization application 620*a* may retrieve attachment 616 from device 604 if it doesn't already have such a file stored in its memory unit. For example, in response to determining that a file attachment 616 is to be associated with a calendar event that the server 602 maintains a record of, the server 602 may check to ensure that the file attachment is stored in the server 602. If the server 602 determines that the attachment is not available at the server 602, then the server 602 may instruct data synchronization application 650*a* to communicate with the data synchronization application 650*b* executing on a computing device that has a copy of the file attachment 616. The data synchronization application 650*a* may retrieve the file attachment 616 from the mobile device 604 and generate an entry in the table 640 for the memory location in which the retrieved attachment 616 is stored. However, if server 602 identifies that attachment 616 is stored in its own memory, the server may generate an association between the attachment and a calendar event. The server 602 may generate a link to a corresponding file attachment in each calendar event that is associated with a file attachment by referring to tables 640 and 642 according to the techniques described above in FIG. 5 for generation of a link to a file attachment within a calendar event.

Once an association is generated between each of the calendar events maintained by the server 602 and their corresponding file attachments, the server 602 may instruct data synchronization application 650*a* to communicate with data synchronization applications on other compatible mobile devices such as mobile devices 604 and 606 to have such devices access and retrieve associations between calendar events and file attachments that they do not previously have access to. Accordingly, the server 602 may synchronize all compatible mobile devices with associations between all of its calendar events and their corresponding file attachments such that the mobile devices may generate a link to each file attachment within the calendar event. For example, mobile device 606 may retrieve calendar events, messages, file attachments, and table 642 of associations between the calendar events and file attachments from server 602. Using such information, the mobile device 606 may generate a link within a calendar event to its associated file attachment such that when a user of the mobile device 606 selects the calendar event for display in a mobile calendar application, the file attachment that is linked to the calendar event may be displayed within the calendar event in the mobile calendar application.

Figure 7A:
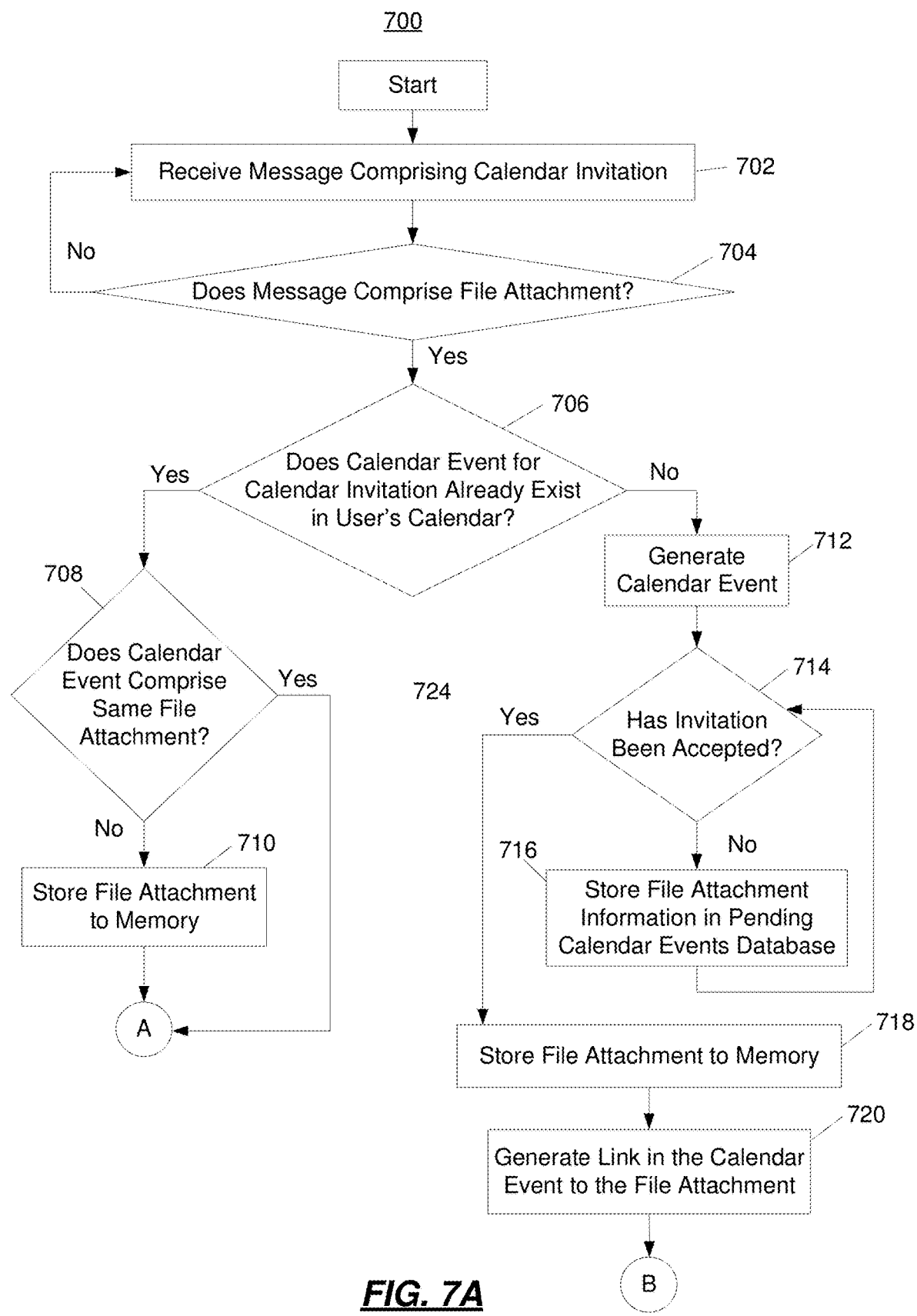
FIGS. 7A and 7B depict flowcharts that illustrate a method of enabling access to file attachments in a mobile calendar application in accordance with one or more illustrative aspects described herein.
Figure 7B:
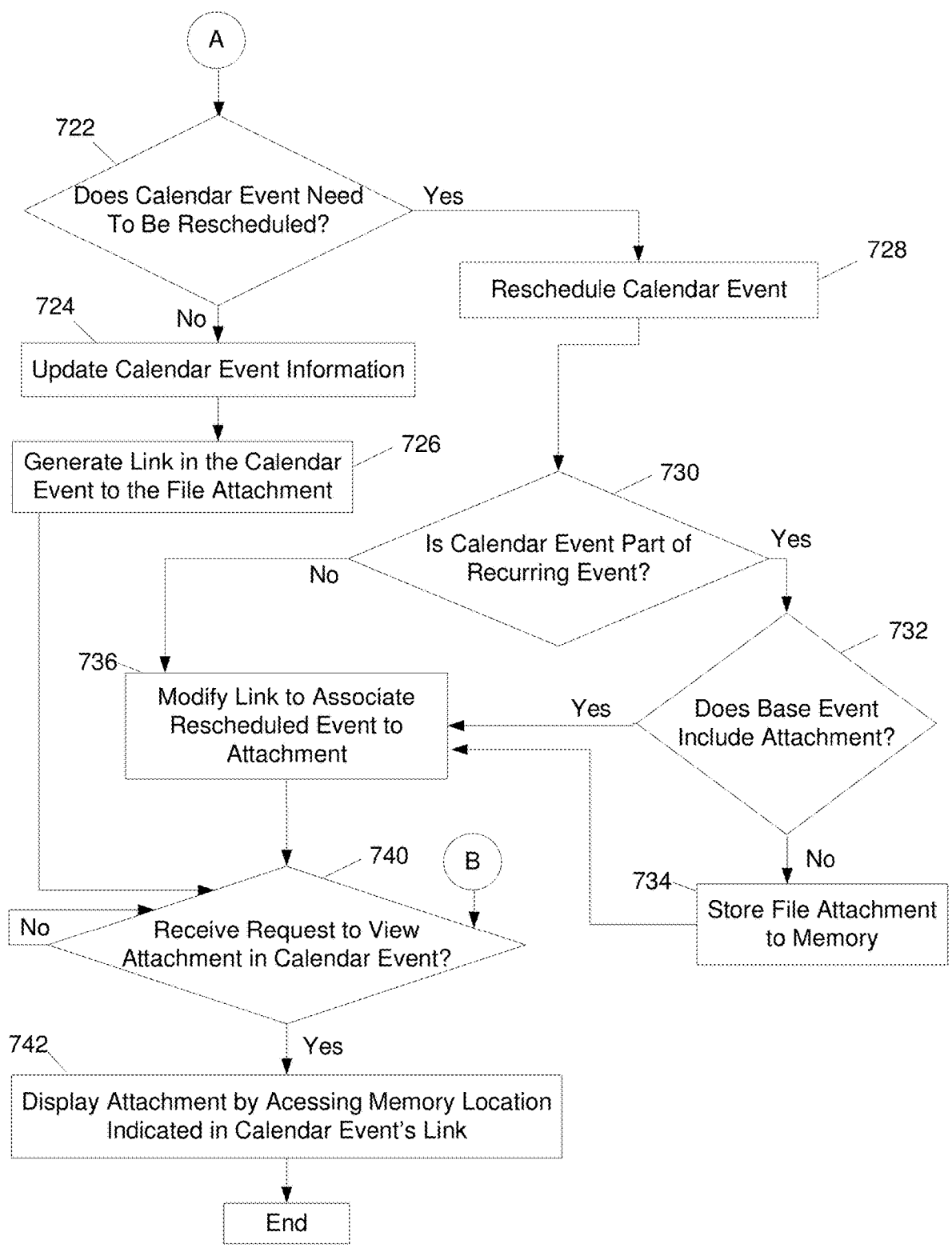

FIGS. 7A and 7B depict flowcharts that illustrate a method 700 of enabling access to file attachments in a mobile calendar application. In one or more embodiments, the method of FIGS. 7A and 7B and/or one or more steps thereof may be performed by the processor of a mobile computing device (e.g., generic computing device 201, client computers 311-314, mobile device 402, or mobile device 502, and mobile device 604). In one or more other embodiments, the method of FIGS. 7A and 7B and/or one or more steps thereof may be performed by the processor of a mobile computing device In other embodiments, the method illustrated in FIGS. 7A and 7B and/or one or more steps thereof may be embodied in computer-executable instructions that are stored in a computer-readable medium, such as a non-transitory computer-readable memory.

As seen in FIG. 7A, the method 700 may begin at step 702 in which a mobile device may receive a message comprising a calendar invitation. A mobile data synchronization application executing on the mobile device may communicate with a remote server and receive messages periodically or as they become available on the remote server. The mobile data synchronization application may provide the received messages to a mobile messaging application executing on the mobile device into a folder that corresponds to the user account that the incoming message from the server is associated with. Each incoming message may be examined to determine whether the message comprises a calendar invitation. For example, the mobile device may determine if the message comprises a calendar invitation or calendar update. If there is a calendar invitation in the message, the method 700 may proceed to step 704.

At step 704, the mobile device may determine whether the received message comprises a file attachment. For example, the mobile device may examine the contents of each incoming message with a calendar invitation to determine if there is a file attachment or a link to a file attachment associated with the calendar invitation. If there is no such file attachment included in the message, the method 700 may not proceed with the remainder of the steps in method 700 and may return to step 702 and continue to monitor for other messages comprising calendar invitation.

At step 706, the mobile device may determine whether the calendar event for the calendar invite already exists in the user's calendar. Upon receiving the message comprising the calendar invitation, the mobile device may identify the identifier of the message and its corresponding calendar invitation. The mobile device may search through the calendar events in the mobile calendar application and its pending calendar database to determine if a calendar event with the same calendar event identifier as the received calendar invitation already exists in the mobile calendar application. For example, if the newly received calendar invitation is a repeat invitation for a preexisting message or an updated invitation with additional details and/or modifications for a preexisting message, the newly received invitation will have the same calendar event identifier as the preexisting calendar event. On the other hand, if the calendar invitation corresponds to a calendar event that does not yet exist in the mobile calendar application, the calendar event identifier might not match any of the preexisting calendar events' identifiers.

At step 708, in response to determining that the calendar event corresponding to the calendar invitation already exists in the mobile device's calendar application, the mobile device may determine whether the preexisting calendar event in the mobile device's calendar application already includes the file attachment received in the message. The mobile device may identify the identifier of the file attachment in the received message. In some embodiments, the file attachment identifier may be the same identifier as the message identifier and/or the calendar event identifier. The mobile device may first determine if the preexisting calendar event includes any file attachments. If there are no file attachments associated with the file identifier, the process 700 may proceed to step 710. However, if there is a file attachment associated with the preexisting calendar event matching the received calendar invitation, the mobile device may compare the attachment identifiers of the attachment received in the received message with that of the file attached to the preexisting calendar event. If the mobile device determines that the preexisting calendar event already includes the same file attachment, the method 700 may proceed to step 722 to determine if the calendar event needs to be rescheduled.

At step 710, in response to determining at step 708 that the preexisting calendar event in the mobile device's calendar application does not include the same attachment as the attachment enclosed in the received message, the mobile device may store the file attachment received in the message to a memory unit. The mobile device may determine that the calendar invitation includes a new file attachment that preexisting calendar event should include upon determining that the preexisting calendar event does not include the file attachment included in the message for the corresponding calendar invitation intended to modify the preexisting calendar event. Accordingly, the file attachment from the received message may be downloaded to a memory device of the mobile device. If the received message includes a link to the file attachment stored in a remote computing device, the link may be stored in lieu of the file attachment in the memory unit for inclusion in the preexisting calendar event when it is to be updated. In another implementation, the mobile device may use the link to download the file attachment from the remote computing device to the memory unit of the mobile device for inclusion in the preexisting calendar event. Once the file attachment has been stored, the method 700 may proceed to step 722 to determine if the calendar event needs to be rescheduled.

At step 712, in response to determining at step 706 that the mobile device's calendar application does not have a preexisting calendar event corresponding to the calendar invitation enclosed in the received message, the mobile device may generate such a calendar event in the mobile calendar application. The calendar event may be populated with details found in the received calendar invitation. The mobile device may assign the newly generated calendar event with a calendar event identifier that corresponds to the identifier of the received message and the calendar invitation from which the calendar event was generated.

At step 714, the mobile device may determine whether the calendar invitation has been accepted by the user. The mobile device may determine if the user of the mobile device has accepted the calendar invitation. The mobile device may monitor both the calendar application and the messaging application to determine if a response message to the received message has been sent to the organizer of the calendar invitation confirming acceptance of the received calendar invitation.

At step 716, upon determining that the calendar invitation has not yet been accepted by the user, the mobile device may store the file attachment in a pending calendar events database until the user accepts the calendar invitation. The mobile device may also maintain the generated calendar event in the pending calendar events database. The mobile device may also monitor the mobile messaging application and the calendar application executing on the mobile device to determine if the user declines the calendar invitation by monitoring for a response sent to the organizer of the calendar invitation declining acceptance of the received calendar invitation. If the user declines the calendar invitation, the mobile device may delete the generated calendar event and the file attachment from the pending calendar events database. If the user declines the calendar invitation, the mobile device may instruct the data synchronization application to instruct a remote server maintaining the user's account data and other computing devices with access to the same calendar and messaging account as the mobile device to delete the calendar event and the file attachment from the pending calendar events database on each of these devices.

At step 718, in response to determining that the calendar invitation has been accepted, the mobile device may store the file attachment to the memory. The calendar event may be moved from the pending calendar database into a scheduled events database of the mobile calendar application. The file attachment from the received message may be downloaded to a memory device of the mobile device. If the received message includes a link to the file attachment stored in a remote computing device, the link may be stored in lieu of the file attachment in the memory unit for inclusion in the preexisting calendar event when it is to be updated. In another implementation, the mobile device may use the link to download the file attachment from the remote computing device to the memory unit of the mobile device for inclusion in the preexisting calendar event. The mobile device may instruct the data synchronization application to inform the remote server maintaining the user's account data and other computing devices with access to the same calendar and messaging account as the mobile device to schedule the corresponding calendar event into a scheduled events database and to download the file attachment onto their respective memory units.

At step 720, the mobile device may generate a link in the calendar event to the file attachment. The mobile device may generate and store an association between the calendar event and the file attachment as shown by table 542 of FIG. 5. Once the file attachment found in the incoming message has been stored in a memory location of the mobile device and the mobile device has generated a calendar event corresponding to the calendar invitation included in the incoming message, the mobile device may generate an association between the generated calendar event in the mobile calendar application and the file attachment stored in the memory of the mobile device. The mobile device may generate such an association in order to enable the file attachment to be accessed from the calendar event in the mobile calendar invitation independently of the messaging application. In order to make such an association, the mobile device may identify the identifier of the file attachment in the incoming message. The mobile device may also determine whether the file attachment in the incoming message is intended to be associated with the calendar invitation included in the incoming message. For example, the mobile device may determine whether the file attachment or the metadata for the file attachment refers to the calendar invitation. Additionally, the mobile device may determine whether the calendar invitation included in the incoming message and/or metadata associated with the calendar invitation refers to the file attachment. The mobile device may further determine if the calendar invitation and/or any executable instructions associated with the calendar invitation includes any function calls to the file attachment included in the incoming message. Upon determining that the file attachment is intended to be associated with the calendar invitation, the mobile device may generate an association between the corresponding calendar event generated from the calendar invitation and the file attachment now stored in the mobile device. The mobile device may generate an association between an identifier of the calendar event an identifier of the file attachment. For example, the mobile device may determine a unique identifier by which the calendar event is identified in the mobile calendar application. The mobile device may also identify a unique identifier by which the file attachment stored in the memory of the mobile device may be identified. The mobile device may generate and store an association between the unique identifier of the calendar event and the file attachment in the mobile device as described above in the description table 540 of FIG. 5.

By identifying which file attachment is associated with a given calendar event and the memory location at which the given file attachment is stored, the mobile device may generate a link to the identified memory location in the calendar event. The calendar event in the mobile calendar application may be modified to include a graphic indicator (e.g., icon) of the file attachment. The graphic indicator may further comprise an embedded link that is generated to the memory location at which the file attachment is stored. Upon generating such a link within the calendar event in the mobile calendar application, the calendar event's generation may be completed and the method 700 may proceed to step 740 to determine if a request has been received to view the attachment in the calendar event.

At step 722, once the file attachment for a preexisting calendar event has either been stored to memory or has been determined to already exist in mobile device, the mobile device may determine whether the calendar event needs to be rescheduled. The mobile device may determine that the received message with a calendar invitation corresponding to the preexisting calendar event may include information on modifying the preexisting calendar event. Accordingly, it may be determined whether the received calendar invitation indicates a change in the scheduled time of the calendar event. If the calendar event needs to be rescheduled, the method 700 may proceed to step 728 to reschedule the calendar event.

At step 724, upon determining in step 722 that the calendar event does not need to be rescheduled, the mobile device may update the calendar event information. For example, if the calendar invitation does not include a change in time for the preexisting scheduled calendar event, the mobile device may determine what other details of the preexisting calendar event require modification, if any, according to the received calendar invitation. By comparing the details of the calendar invitation against the calendar event information of the preexisting calendar event, the mobile device may determine whether the participant information, the title, location, and/or text of the calendar event needs to be modified. Upon determining the item(s) that require modification, the mobile device may implement the modifications to the calendar event information and update the calendar event in the mobile calendar application. The data synchronization application may be instructed to communicate such changes to the corresponding calendar event stored in the remote server and other computing devices with access to the same user calendar account.

At step 726, the mobile device may generate a link in the calendar event to the file attachment if such a link does not already exist. The mobile device may determine if a link already exists in the preexisting calendar event to the file attachment. If the file attachment did not exist in the preexisting calendar event before the message with the updated calendar invitation was received at the mobile device, the mobile device may generate a link to the file attachment found in the message. By identifying which file attachment is associated with the preexisting calendar event and the memory location at which the given file attachment is stored at step 710, the mobile device may generate a link to the identified memory location in the calendar event. The calendar event in the mobile calendar application may be modified to include a graphic indicator (e.g., icon) of the file attachment. The graphic indicator may further comprise an embedded link that is generated to the memory location at which the file attachment is stored. Upon generating such a link within the calendar event in the mobile calendar application, the calendar event's updated may be completed and the method 700 may proceed to step 740 to determine if a request has been received to view the attachment in the calendar event.

At step 728, in response to determining at step 722 that the calendar event needs to be rescheduled, the mobile device may reschedule the calendar event. For example, the mobile device may determine the new time at which the calendar invitation indicates the calendar event should be rescheduled. The mobile device may modify the calendar event in the mobile calendar application to the rescheduled time. The mobile device may also determine if such rescheduling creates a conflict by determining if the rescheduled calendar event overlaps with any other previously scheduled calendar events at the rescheduled time.

At step 730, the mobile device may determine whether the calendar event corresponding to the received calendar invitation is part of a recurring calendar event. For example, the calendar event may be examined to determine if it is related to one or more other calendar events. Recurring calendar events may have a shared calendar event identifier and/or may be scheduled to occur at the same time periodically. Although the rescheduled event has been modified and may be out of the recurring time scheme of the recurring events, the mobile device may determine if all of the recurring events are to be rescheduled or if the calendar invitation only indicated the rescheduling of just the given calendar event. If the mobile device determines that the calendar event is not a part of a recurring calendar event, the method 700 may proceed to step 736 to modify the link in the calendar event to a file attachment in order to associate the rescheduled event with the file attachment.

At step 732, in response to determining that the calendar event is part of a recurring event, the mobile device may determine whether the base event of the recurring event includes the same file attachment as the attachment enclosed in the message received at step 702. The base event of the recurring series of calendar events may be examined to determine if it includes a file attachment. If the base event includes a file attachment, the identifier of the file attachment may compared against the identifier of the file attachment in the message received at step 702 to determine if the same file attachment is already associated with the base event. If the mobile device determines that the base event contains the same attachment, the method 700 may proceed to step 736 to modify the link in the calendar event to a file attachment in order to associate the rescheduled event with the file attachment.

At step 734, in response to determining that the base event of the recurring series of calendar events does not include the file attachment received at step 702, the mobile device may store the received file attachment to memory. The mobile device may determine that the calendar invitation includes a new file attachment that the base calendar event should include upon determining that the base calendar event does not include the file attachment included in the message for the corresponding calendar invitation intended to modify the preexisting calendar event. Accordingly, the file attachment from the received message may be downloaded to a memory device of the mobile device. If the received message includes a link to the file attachment stored in a remote computing device, the link may be stored in lieu of the file attachment in the memory unit for inclusion in the preexisting calendar event when it is to be updated. In another implementation, the mobile device may use the link to download the file attachment from the remote computing device to the memory unit of the mobile device for inclusion in the preexisting calendar event. Once the file attachment has been stored, the method 700 may proceed to step 736.

At step 736, the mobile device may modify the link in the calendar event to a file attachment in order to associate the rescheduled event with the file attachment. The mobile device may either generate a link if one does not already exist within the rescheduled calendar event to its associated file attachment. If the base event of the recurring event or the preexisting calendar event did not previously include the file attachment before the file attachment was received in step 702, an association between the rescheduled calendar event and the file attachment may be generated and the link may reflect such an association. The mobile device may generate a graphic indicator comprising the link within the calendar event. However, if the preexisting calendar event does include a link to the file attachment before the message was received at step 702, the link may be modified at step 736 to reflect the rescheduling of the calendar event. For example, the mobile device may modify the association between the file attachment and the preexisting calendar event to ensure that the file attachment is associated with the rescheduled calendar event and not the previously existing calendar event. The mobile device may generate or modify the link within the rescheduled calendar event in mobile calendar application to reflect such a change.

At step 740, the mobile device may determine whether a request to view the attachment within the calendar event has been received. The mobile device may receive such a request by monitoring the user activity with the user interface of the mobile device and determine whether any of these user interactions include a request to view the calendar event. If the user has requested to view the calendar event, the mobile device may further determine if the user has selected the graphic indicator displayed in the calendar event. If the mobile device has not received such a request to display the file attachment within the calendar event displayed in the mobile calendar application, the mobile device may continue monitoring user interactions with the mobile calendar application until such a request is received.

At step 742, once the request to view the attachment has been received, the mobile device may display the attachment by accessing the memory location indicated in the calendar event's link. Upon determining that the user has selected the file attachment graphic indicator that is displayed within the calendar event in the mobile calendar application, the mobile device 502 may open the link, retrieve the file attachment stored in the memory location specified in the link, and generate a display of the file attachment within the displayed calendar event.

Although the subject matter has been described in language specific to structural features and/or methodological acts, it is to be understood that the subject matter defined in the appended claims is not necessarily limited to the specific features or acts described above. Rather, the specific features and acts described above are described as illustrative implementations of the following claims. It is to be understood that the above disclosure is illustrative only. The following illustrative embodiments are representative only, and not intended to be limiting in any respect.

What is claimed is:
1. A method comprising:
  receiving an electronic invitation through a messaging application executable on a mobile device, the electronic invitation including a first file attachment that has been modified from a second file attachment, wherein a link, in a calendar event of a calendar application executable on the mobile device, to the second file attachment, is preexisting;
  determining that the calendar event generated by the electronic invitation is to be associated with the first file attachment;
  monitoring a status of the calendar event;

updating a table storing the link based on a change in the status of the calendar event;
modifying the link, in the calendar event of the calendar application that is different from the messaging application, to the second file attachment, so that the modified link provides access to the first file attachment in memory of the mobile device instead of the second file attachment;
generating a display of the calendar application that includes information of the first file attachment based on data accessible from a location of the memory indicated by the modified link;
retrieving the first file attachment from a location of the memory indicated by the modified link and generating a display of the first file attachment within the calendar event, and
receiving an updated electronic invitation, the updated electronic invitation indicating rescheduling the calendar event;
determining, based on the modified link, that the first file attachment is associated with a rescheduled calendar event indicated by the updated electronic invitation; and
updating the modified link to associate the first file attachment with the rescheduled calendar event.

2. The method of claim 1, further comprising: storing the first file attachment in the location of the memory based on a determination that the electronic invitation has been accepted.

3. The method of claim 1, further comprising:
instructing an application executable on the mobile device to identify at least one desktop device that includes one or more existing file attachments associated with a calendar event indicated by the first file attachment; and
determining whether the one or more existing file attachments comprise the first file attachment.

4. The method of claim 3, further comprising:
based on determining that the one or more existing file attachments associated with the calendar event comprise the first file attachment, requesting the first file attachment from the at least one desktop device; and
receiving, by the mobile device, the requested first file attachment from the at least one desktop device.

5. The method of claim 1, further comprising:
responsive to determining that the electronic invitation has been accepted, transmitting a response message accepting the electronic invitation, wherein the link is generated in response to transmitting the response message.

6. The method of claim 1, further comprising:
instructing a mobile data synchronization application executing on the mobile device to transmit the link to a computing device remotely located from the mobile device; and
instructing the mobile data synchronization application to store the link in the table, wherein the link corresponds to a user account to which the electronic invitation was addressed.

7. An apparatus comprising:
one or more processors; and
memory storing instructions that, when executed by the one or more processors, cause the apparatus to:
receive an electronic invitation through a messaging application executable on the apparatus, the electronic invitation including a first file attachment that has been modified from a second file attachment, wherein a link, in a calendar event of a calendar application executable on the apparatus, to the second file attachment, is preexisting;
determine that the calendar event generated by the electronic invitation is to be associated with the first file attachment;
monitor a status of the calendar event;
update a table storing the link based on a change in the status of the calendar event;
modify the link, in the calendar event of the calendar application that is different from the messaging application, to the second file attachment, so that the modified link provides access to the first file attachment in memory of the apparatus instead of the second file attachment;
generate a display of the calendar application that includes information of the first file attachment based on data accessible from a location of the memory indicated by the modified link;
retrieve the first file attachment from a location of the memory indicated by the modified link and generate a display of the first file attachment within the calendar event;
receive an updated electronic invitation, the updated electronic invitation indicating rescheduling the calendar event;
determine, based on the modified link, that the first file attachment is associated with a rescheduled calendar event indicated by the updated electronic invitation; and
update the modified link to associate the first file attachment with the rescheduled calendar event.

8. The apparatus of claim 7, wherein the instructions that, when executed by the one or more processors, further cause the apparatus to:
store the first file attachment in the location of the memory based on a determination that the electronic invitation has been accepted.

9. The apparatus of claim 7, wherein the instructions that, when executed by the one or more processors, further cause the apparatus to:
instruct an application executable on the apparatus to identify at least one desktop device that includes one or more existing file attachments associated with a calendar event indicated by the first file attachment; and
determine whether the one or more existing file attachments comprise the first file attachment.

10. The apparatus of claim 9, wherein the instructions that, when executed by the one or more processors, further cause the apparatus to:
based on determining that the one or more existing file attachments associated with the calendar event comprise the first file attachment, request the first file attachment from the at least one desktop device; and
receive the requested first file attachment from the at least one desktop device.

11. The apparatus of claim 7, wherein the instructions that, when executed by the one or more processors, further cause the apparatus to:
responsive to determining that the electronic invitation has been accepted, transmit a response message accepting the electronic invitation, wherein the link is generated in response to transmitting the response message.

12. The apparatus of claim 7, wherein the instructions that, when executed by the one or more processors, further cause the apparatus to:

instruct a mobile data synchronization application executing on the apparatus to transmit the link to a computing device remotely located from the apparatus; and instruct the mobile data synchronization application to store the link in the table, wherein the link corresponds to a user account to which the electronic invitation was addressed.

13. A system comprising:

a first device and a second device, wherein the first device comprises:
- one or more first processors; and
- memory storing first instructions that, when executed by the one or more first processors, cause the first device to:
  - receive an electronic invitation through a messaging application executable on the first device, the electronic invitation including a first file attachment that has been modified from a second file attachment, wherein a link, in a calendar event of a calendar application executable on the first device, to the second file attachment, is preexisting;
  - determine that the calendar event generated by the electronic invitation is to be associated with the first file attachment;
  - monitor a status of the calendar event;
  - update a table storing the link based on a change in the status of the calendar event;
  - modify the link, in the calendar event of the calendar application that is different from the messaging application, to the second file attachment, so that the modified link provides access to the first file attachment in memory of the first device instead of the second file attachment;
  - generate a display of the calendar application that includes information of the first file attachment based on data accessible from a location of the memory indicated by the modified link;
  - retrieve the first file attachment from a location of the memory indicated by the modified link and generating a display of the first file attachment within the calendar event;
  - receive an updated electronic invitation, the updated electronic invitation indicating rescheduling the calendar event;
  - determine, based on the modified link, that the first file attachment is associated with a rescheduled calendar event indicated by the updated electronic invitation; and
  - update the modified link to associate the first file attachment with the rescheduled calendar event; and wherein the second device comprises:
- one or more second processors; and
- memory storing second instructions that, when executed by the one or more second processors, cause the second device to:
  - send the electronic invitation to the first device; and
  - send the updated electronic invitation to the first device.

14. The system of claim 13, wherein the first instructions, when executed by the one or more processors, further cause the first device to:
store the first file attachment in the location of the memory based on a determination that the electronic invitation has been accepted.

15. The system of claim 13, wherein the first instructions, when executed by the one or more processors, further cause the first device to:
instruct an application executable on the first device to identify at least one desktop device that includes one or more existing file attachments associated with a calendar event indicated by the first file attachment; and
determine whether the one or more existing file attachments comprise the first file attachment.

16. The system of claim 15, wherein the first instructions, when executed by the one or more processors, further cause the first device to:
based on determining that the one or more existing file attachments associated with the calendar event comprise the first file attachment, request the first file attachment from the at least one desktop device; and
receive the requested first file attachment from the at least one desktop device.

17. The system of claim 13, wherein the first instructions, when executed by the one or more processors, further cause the first device to:
responsive to determining that the electronic invitation has been accepted, transmit a response message accepting the electronic invitation, wherein the link is generated in response to transmitting the response message.

18. The system of claim 13, wherein the first instructions, when executed by the one or more processors, further cause the first device to:
instruct a mobile data synchronization application executing on the first device to transmit the link to a computing device remotely located from the first device; and
instruct the mobile data synchronization application to store the link in the table, wherein the link corresponds to a user account to which the electronic invitation was addressed.

* * * * *